United States Patent
Shrivastava

(10) Patent No.: US 12,180,073 B2
(45) Date of Patent: Dec. 31, 2024

(54) PROCESS AND PLANT FOR PRODUCING HYDROGEN BY STEAM REFORMING AND HIGH-TEMPERATURE ELECTROLYSIS

(71) Applicant: L'Air Liquide, Société Anonyme pour l'Etude et l'Exploitation des Procédés Georges Claude, Paris (FR)

(72) Inventor: Swatantra Kumar Shrivastava, Lich (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 538 days.

(21) Appl. No.: 17/472,043

(22) Filed: Sep. 10, 2021

(65) Prior Publication Data
US 2022/0081290 A1    Mar. 17, 2022

(30) Foreign Application Priority Data
Sep. 11, 2020    (EP) ..................................... 20020409

(51) Int. Cl.
| | | |
|---|---|---|
| C01B 3/32 | (2006.01) | |
| C01B 3/50 | (2006.01) | |
| C25B 1/042 | (2021.01) | |
| C25B 1/23 | (2021.01) | |
| F01K 27/00 | (2006.01) | |

(52) U.S. Cl.
CPC .................. *C01B 3/32* (2013.01); *C01B 3/50* (2013.01); *C25B 1/042* (2021.01); *C25B 1/23* (2021.01); *F01K 27/00* (2013.01); *C01B 2203/0216* (2013.01); *C01B 2203/06* (2013.01); *C01B 2203/0811* (2013.01)

(58) Field of Classification Search
CPC .............. C25B 1/04; C25B 1/042; C25B 1/23
See application file for complete search history.

(56) References Cited

U.S. PATENT DOCUMENTS

| | | | | |
|---|---|---|---|---|
| 10,422,046 | B2 * | 9/2019 | Koseoglu | ................. C10K 3/04 |
| 11,421,329 | B2 * | 8/2022 | Marushima | ........... C25B 15/085 |

(Continued)

FOREIGN PATENT DOCUMENTS

| | | |
|---|---|---|
| DE | 10 2019 214812 | 6/2020 |
| KR | 2005 0075628 | 7/2005 |

(Continued)

OTHER PUBLICATIONS

European Search Report for corresponding EP 20020409.7, Feb. 23, 2021.

*Primary Examiner* — Brian W Cohen
(74) *Attorney, Agent, or Firm* — Elwood L. Haynes

(57) ABSTRACT

The invention relates to a process and a plant for producing hydrogen by steam reforming and high-temperature electrolysis. Steam reforming produces a synthesis gas from a carbon-containing starting material and steam. Process heat generated in the context of the steam reforming is utilized for producing steam from water. Thus-produced steam is utilized as reactant for producing an electrolysis product in a high-temperature electrolysis step, wherein the electrolysis product includes at least hydrogen and oxygen. Hydrogen is separated from the synthesis gas produced by steam reforming and from the electrolysis product produced by high-temperature electrolysis.

11 Claims, 2 Drawing Sheets

(56) References Cited

U.S. PATENT DOCUMENTS

| | | |
|---|---|---|
| 2007/0122339 A1 | 5/2007 | Kulkarni et al. |
| 2007/0217995 A1* | 9/2007 | Matsumura ............... C25B 1/04 422/162 |
| 2013/0126038 A1* | 5/2013 | Jamal .................. H01M 8/0637 429/411 |
| 2020/0109051 A1* | 4/2020 | Aasberg-Petersen ..... C25B 1/04 |

FOREIGN PATENT DOCUMENTS

| WO | WO 2011 120706 | 10/2011 |
| WO | WO 2019 020515 | 1/2019 |
| WO | WO 2019 020519 | 1/2019 |
| WO | WO 2019 147786 | 8/2019 |

\* cited by examiner

PROCESS AND PLANT FOR PRODUCING HYDROGEN BY STEAM REFORMING AND HIGH-TEMPERATURE ELECTROLYSIS

CROSS REFERENCE TO RELATED APPLICATIONS

This application claims priority to EP 20020409.7, filed Sep. 11, 2020, the entire contents of which are incorporated herein by reference.

BACKGROUND

Field of the Invention

The invention relates to a process and a plant for producing hydrogen by steam reforming and high-temperature electrolysis.

Prior Art

Hydrogen is today produced mainly by steam reforming of carbon-containing feedstocks such as natural gas which is composed mainly of methane (so-called steam methane reforming—SMR). The methane is reacted with steam to afford a mixture of hydrogen, carbon monoxide and carbon dioxide known as synthesis gas. The carbon monoxide is then typically converted into carbon dioxide and hydrogen via a so-called water gas shift to increase the hydrogen yield. The hydrogen is subsequently separated from the remaining product gases by pressure swing adsorption and thus obtained in pure form.

Steam reforming is a strongly endothermic process and therefore requires the supply of external energy. This is generally effected through burners arranged in a reformer furnace at the bottom, at the top or in exceptional cases laterally or in a terraced fashion, whose fuel gases fire nickel catalyst-filled reaction tubes arranged vertically. The reaction tubes, which are arranged in a plurality of rows inside the reformer furnace, are supplied with natural gas and steam via supply conduits.

The steam reforming is performed at temperatures of about 800° C. to 900° C. This makes it possible to utilize the process heat present not only in the combustion gases of the burners but also in the hot synthesis gas to produce export steam since only a portion of this heat is utilized process-internally, for example for internal steam production and preheating of the carbon-containing starting material. This is effected during cooling of the combustion gases and the synthesis gas, wherein water is converted into steam. The export steam formed is normally low pressure steam. In a refinery hydrogen plant this excess coproduced steam is exported into the steam collectors of the refinery.

In recent times the value of this export steam has continuously fallen for many plant sites. For scenarios in which the fuel gases are more cost-effective relative to the carbon-containing starting material used for the SMR (for example natural gas) and export steam simultaneously has a relatively low value it is difficult to configure the steam reforming process for high thermal efficiencies. Such scenarios therefore often result in configurations with relatively high carbon dioxide emissions. In light of anthropogenic climate change and assuming that carbon dioxide taxes will continuously increase in future this is undesirable for ecological and economic reasons.

Hydrogen may also be produced by electrolysis of water, preferably using electricity from renewable energy sources, So-called high-temperature electrolysis is more economic than electrolysis at room temperature since a portion of the energy required for splitting of hydrogen and oxygen is provided in the form of heat. However, the technology is still in development and it is not yet possible at present for reasons of economy and efficiency to replace the steam reforming processes that have long been established on an industrial scale by high-temperature electrolysis. In particular, for a particular hydrogen amount to be produced per unit time, construction of a high-temperature electrolysis plant would be expected to entail significantly higher capital expenditure (CAPEX) costs than the construction of a steam reforming plant.

Substantial disadvantages of the steam reforming process are thus the employed carbon-containing feedstock material, which results in direct carbon dioxide emissions, the coproduction of steadily devaluing export steam and the carbon dioxide emissions resulting from the formation of combustion gases during the firing of the reaction tubes of the reformer furnace. High-temperature electrolysis solves the problem of direct carbon dioxide emissions by replacing the carbon-containing starting material with water and/or steam. However, disadvantages arise due to the high capital expenditure (CAPEX) and also high costs of fossil fuel electricity (for example from coal power) or electricity from renewable energy. Fossil fuel electricity in turn entails indirect carbon dioxide emissions. On the other hand the use of electricity from renewable energy sources is likely to result in even higher operating costs (OPEX).

KR100514178B1 describes a process in which a product gas (synthesis gas) from a partial oxidation or an autothermal reformer is used as a heat source for an electrolyzer. The oxygen produced in the electrolysis is used as reactant for the partial oxidation or the autothermal reformer.

SUMMARY

It is a general object of the present invention to overcome the abovementioned disadvantages of the prior art.

It is especially an object of the present invention to provide a process which supplies export steam produced in the steam reforming process to an alternative, ideally process-internal, utilization.

It is a further object of the present invention to provide a process exhibiting lower effective carbon dioxide emissions (emitted amount of carbon dioxide per standard cubic meter of produced hydrogen).

It is a further object of the present invention to provide a plant which solves at least one of the abovementioned objects.

The independent claims make a contribution to the at least partial achievement of at least one of the above objects. The dependent claims provide preferred embodiments which contribute to the at least partial achievement of at least one of the objects. Preferred embodiments of constituents of one category according to the invention are, where relevant, likewise preferred for identically named or corresponding constituents of a respective other category according to the invention.

The terms "having", "comprising" or "containing", etc., do not preclude the possible presence of further elements, ingredients, etc. The indefinite article "a" does not preclude the possible presence of a plurality.

The objects of the invention are at least partially achieved by a process for producing hydrogen by steam reforming and high-temperature electrolysis, wherein the process comprises the steps of:

(a) producing a synthesis gas from a carbon-containing starting material and steam by steam reforming, wherein the synthesis gas comprises at least hydrogen, carbon monoxide and carbon dioxide;
(b) producing steam by heating water using process heat generated in step (a);
(c) using the steam produced in step (b) as reactant in a high-temperature electrolysis step for producing an electrolysis product, wherein the electrolysis product comprises hydrogen and oxygen;
(d) separating hydrogen from the synthesis gas obtained in step (a) and from the electrolysis product obtained in step (c).

In the context of the present disclosure the term "steam" is to be understood as meaning water steam unless otherwise stated.

The carbon-containing starting material according to step (a) comprises especially natural gas, in particular its main component methane. Other carbon-containing compounds, in particular higher hydrocarbons such as ethane, propane and/or butane may likewise be present in the carbon-containing starting material. In such cases the carbon-containing starting material is subjected to a prereforming step in a prereformer to convert higher hydrocarbons into short chain hydrocarbons with steam, in particular for the purpose of increasing the methane proportion in the carbon-containing starting material. In the prereforming hydrocarbons having at least two carbon atoms are converted into carbon monoxide, hydrogen and methane. Carbon-containing starting material that has been reacted in the prereformer may thus already contain a certain amount of synthesis gas.

The carbon-containing starting material is also preferably subjected to a hydrodesulfurization step to remove sulfur compounds from the carbon-containing starting material. Sulfur compounds are a catalyst poison for the nickel catalyst used in the steam reforming.

The carbon-containing starting material is heated and preferably at 750° C. to 920° C. subjected to the actual endothermic steam reforming to form synthesis gas. Steam reforming proceeds according to the following reaction scheme

$$CH_4 + H_2O \rightleftharpoons CO + 3H_2 \quad (1)$$

$$CH_4 + 2H_2O \rightleftharpoons CO_2 + 4H_2 \quad (2)$$

The primarily formed synthesis gas which according to (1) and (2) comprises hydrogen, carbon monoxide and carbon dioxide is preferably reacted according to the following reaction scheme in a subsequent water gas shift reaction to increase the hydrogen yield.

$$CO + H_2O \rightleftharpoons CO_2 + H_2 \quad (3)$$

The water gas shift reaction according to (3) is exothermic.

The ratio of the employed steam in kg per produced standard cubic meter ($Nm^3$) of hydrogen in respect of step (a); i.e. the steam reforming part, is between 0.2 and 1.0. The actual value is determined by the costs of the fuel gases utilized for the firing, the carbon-containing starting material and the value of the steam produced according to step (b).

Process heat formed in the endothermic steam reforming is according to step (b) utilized for steam production by heating and evaporating water by transfer of the process heat. Process heat is in particular to be understood as meaning waste heat which is liberated in the context of the steam reforming and may be used by forming steam in the context of a heat recovery.

According to the invention step (c) comprises utilizing the steam produced according to step (b) as reactant in a high-temperature electrolysis step for producing an electrolysis product, wherein the electrolysis product comprises at least hydrogen and oxygen; The steam produced according to step (b) is used directly as vaporous reactant (steam) or in liquefied form as water at an appropriate pressure in the high-temperature electrolysis step.

The term "high-temperature electrolysis" comprises electrolysis processes performed at temperatures of preferably 100° C. to 850° C. The high-temperature electrolysis step according to step (c) is correspondingly preferably performed at 100° C. to 850° C. Higher temperatures markedly below the thermolysis temperature of water are likewise possible. In particular the high-temperature electrolysis step may be performed at temperatures of up to 900° C. or 1000° C. or 1100° C. or 1200° C. The high-temperature electrolysis step is further preferably performed at a process temperature of at least 500° C. In the high-temperature electrolysis step the steam formed in step (b) and used as reactant is split into the electrolysis product gases hydrogen and oxygen by supplying electricity, i.e. electrical current, in particular electrical direct current.

Performance of the high-temperature electrolysis according to step (c) may require further auxiliaries in addition to the reactant steam, for example electrolytes or organic solvents.

The process according to the invention integrates two different processes, namely
reforming a carbon-containing starting material with steam (steam reforming) to afford synthesis gas (hydrogen, carbon monoxide and carbon dioxide) and
high-temperature electrolysis of steam, also water steam and/or water to afford an electrolysis product comprising hydrogen and oxygen, into a joint integrated process.

The objective of this process is the production of hydrogen. Step (d) therefore comprises separating hydrogen from the synthesis gas obtained in step (a) and separating hydrogen from the electrolysis product obtained in step (c). The thus obtained hydrogen streams may subsequently be combined into a combined hydrogen stream.

Separation of the hydrogen from the synthesis gas is preferably effected via a pressure swing adsorption step, alternatively or in addition thereto a membrane separation step. Depending on the process mode the offgas remaining upon separation of the hydrogen contains differing proportions of gases having a high calorific value, for example unseparated hydrogen, unconverted methane and/or carbon monoxide not converted in the context of the water gas shift. The offgas may therefore be used as fuel gas for the firing in the context of the steam reforming according to step (a).

The proportion of the produced hydrogen according to step (c), i.e. the proportion of the hydrogen produced by the high-temperature electrolysis step based on the total amount of the produced hydrogen, is preferably between 1% and 40% (in volume percent). The optimal value is determined by the costs of the carbon-containing starting material, the fuel gas, electricity for the high-temperature electrolyzer and the value of the steam produced according to step (b).

The process makes it possible to advantageously vary the hydrogen amount produced by steam reforming according to step (a) and high-temperature electrolysis according to step (c). Step (a) and step (c) may advantageously be performed independently of one another. This means it is possible over a particular time interval to produce hydrogen only on the basis of the high-temperature electrolysis or only on the basis of the steam reforming. For example hydrogen may be produced exclusively by steam reforming when the high-temperature electrolyzer is subjected to maintenance and vice versa. This may also be done according to the current hydrogen demand. When the demand for hydrogen in respect of a particular plant happens to be low, production by step (c) may be curbed and more export steam produced instead. The amount of hydrogen produced by high-temperature electrolysis according to step (c) may be curbed when more export steam is required, for example for an adjacent plant, in a particular time interval and conversely increased when less export steam is required in a particular time interval.

The process according to the invention further solves the general problem of stand-alone high-temperature electrolysis plants which require long warmup phases to go from idle to activation. This phase is shortened since the steam reforming according to step (a) ensures that process heat, for example in the form of steam, is permanently available for heating processes.

One embodiment of the process according to the invention is characterized in that the process heat produced in step (a) is provided by cooling the synthesis gas produced in step (a).

The process heat produced in the hot synthesis gas according to step (a) is transferred to water to produce steam according to step (b). Process-internal process heat is thus advantageously utilized directly for producing the reactant steam which is used for the high-temperature electrolysis step according to step (c).

One embodiment of the process according to the invention is characterized in that the process heat produced in step (a) is provided by cooling combustion gases, wherein the combustion gases are produced during combustion of fuel gases, wherein the fuel gases are utilized for firing the endothermic reforming reaction in the steam reforming.

The process heat produced during combustion of the fuel gases to form combustion gases according to step (a) is transferred to water to produce steam according to step (b). Process-internal process heat is thus advantageously utilized directly for producing the reactant steam which is used for the high-temperature electrolysis step according to step (c).

The endothermic steam reforming generates process heat since the firing of the reaction tubes using fuel gases forms hot combustion gases. The formation of the hot synthesis gas also forms process heat. Both types of process heat may subsequently be utilized for producing the reactant steam required for step (c) alone or in combination.

One embodiment of the process according to the invention is characterized in that the steam produced in step (b) is utilized for generating electricity and the generated electricity is utilized for producing the electrolysis product in the high-temperature electrolysis step according to step (c).

The steam produced according to step (b) may in part be utilized for generating the electricity required for the high-temperature electrolysis step by converting the kinetic and thermal energy present in the steam into electrical energy. This has the result that less electricity, i.e. electrical current, from external sources need be imported for the high-temperature electrolysis step. The process may furthermore thus advantageously be configured such that no external energy source for the import of electricity is required. Techno-economic analysis of a thus-configured process (no external source of electricity) has shown that this reduces the specific carbon dioxide emissions (mass of produced carbon dioxide in kilograms per unit volume of produced hydrogen in standard cubic metres) by up to 2.1% compared to a pure steam reforming process.

In one example the steam produced in step (b) is sent to a steam turbine and the electricity is generated by a generator arranged downstream of the steam turbine.

This is an example of an established technology for generating electricity using steam. Other technologies known to those skilled in the art for generating electrical current from steam may likewise be utilized in the context of the invention.

In one example a portion of the steam may be withdrawn from the steam turbine and sent as reactant to the high-temperature electrolysis step according to step (c).

This allows further flexibilization of the process, for example when more steam from the cooling of combustion gases or hot synthesis gas is to be directly withdrawn from the process as export steam.

One embodiment of the process according to the invention is characterized in that an external electricity source is utilized for producing the electrolysis product in the high-temperature electrolysis step according to step (c).

In this case the electrical current required for the step of the high-temperature electrolysis is at least partially imported from an external electricity source. The more steam is required as export steam and/or reactant steam for step (c), the more electricity may be imported without requiring process-internal generation thereof.

In one example the external electricity source provides electricity from a renewable energy source.

Especially in the case where predominantly or exclusively electricity from renewable energy sources is available for the step of the high-temperature electrolysis it is expedient to utilize the steam produced according to step (b) exclusively as reactant steam for the high-temperature electrolysis step according to step (c). This noticeably reduces the effective carbon dioxide emissions of the process. Techno-economic analysis of a thus-configured process (exclusive use of electricity from renewable energy sources, no internal conversion of steam into electrical current) has shown that this reduces the specific carbon dioxide emissions (mass of produced carbon dioxide in kg per unit volume of produced hydrogen in standard cubic meters) by up to 8.5% compared to a conventional pure steam reforming process.

One embodiment of the process according to the invention is characterized in that the high-temperature electrolysis step according to step (c) employs exclusively steam as reactant, wherein the electrolysis product comprises hydrogen and oxygen.

For the simplest case of the process according to the invention pure or substantially pure steam is used as reactant for the high-temperature electrolysis step according to step (c). The electrolysis product in this case is a mixture of hydrogen and oxygen. The hydrogen produced at the cathode of the high-temperature electrolyzer is separated from the oxygen produced at the anode by a separator in the context of step (d). The oxygen produced at the anode may be sent for a further use, for example a sulfur recovery process (Claus process) present in the same plant complex.

One embodiment of the process according to the invention is characterized in that the high-temperature electrolysis step according to step (c) employs both steam and carbon dioxide as reactants; wherein the electrolysis product comprises synthesis gas and oxygen.

In this configuration of the process according to the invention carbon dioxide and water-bonded hydrogen are reduced to carbon monoxide and free hydrogen at the cathode of the high-temperature electrolyzer. At the cathode of the high-temperature electrolyzer water-bonded oxygen is oxidized to free oxygen. This is also referred to as high-temperature co-electrolysis. In this case the electrolysis product is a mixture of synthesis gas and oxygen.

The synthesis gas preferably comprises hydrogen and carbon monoxide.

The synthesis gas produced at the cathode of the high-temperature electrolyzer, which in any case comprises hydrogen, is separated from the oxygen produced at the anode by a separator in the context of step (d). The oxygen produced at the anode may be sent for a further use. The synthesis gas itself may be separated into carbon monoxide and hydrogen in a downstream separation step. It is alternatively sent to a water gas shift step to increase the hydrogen yield. The carbon dioxide produced as a by-product after separation of the hydrogen may in turn be sent to the high-temperature electrolysis step according to step (c). The synthesis gas is alternatively sent directly to a downstream synthesis stage, for example a methanol synthesis.

The carbon dioxide used as reactant for the high-temperature electrolysis step is preferably obtained by separation from the synthesis gas produced in step (a).

If the high-temperature electrolysis step of step (c) is to afford a mixture of synthesis gas and oxygen as the electrolysis product the ecological balance of the process may be improved since the carbon dioxide compulsorily formed in the context of step (a) is used in addition to steam as one of the reactants for step (c). Especially in the context of the water gas shift reaction preferably employed by step (a) large amounts of carbon dioxide are generated which may thus be sent for useful utilization. The carbon dioxide is generated as offgas for example in the separation of the hydrogen according to step (d) by pressure swing adsorption and/or membrane separation. The carbon dioxide is preferably initially obtained in pure form before it is sent to the high-temperature electrolysis step according to step (c). This may be effected for example by a physical or chemical gas scrubbing or by a cryogenic process in which the carbon dioxide is separated from the respective gas mixture by condensation of other gas constituents.

The objects of the present invention are further at least partially solved by a plant for producing hydrogen by steam reforming and high-temperature electrolysis, wherein the plant comprises the following plant components in fluid connection with one another:
(a) a steam reforming unit for producing a synthesis gas from a carbon-containing starting material and steam by steam reforming, wherein the synthesis gas comprises at least hydrogen, carbon monoxide and carbon dioxide;
(b) means for producing steam by heating water using process heat produced in the steam reforming unit (a);
(c) a high-temperature electrolyzes for producing an electrolysis product comprising hydrogen and oxygen from steam produced by the means (b) as reactant;
(d) an apparatus for separating hydrogen from synthesis gas produced using the steam reforming unit (a) and an apparatus for separating hydrogen from electrolysis product produced using the high-temperature electrolyzer (c).

The objects of the invention are further at least partially solved by the plant according to the invention configured for performing the process according to the invention.

The objects of the invention are further at least partially solved by a use of the plant according to the invention for producing hydrogen and oxygen or for producing synthesis gas and oxygen.

BRIEF DESCRIPTION OF THE DRAWINGS

Further features and configurations of the invention will be apparent from the description of the following working examples. The working examples are nonlimiting to the invention.

DETAILED DESCRIPTION OF PREFERRED EMBODIMENTS in the figures and the following descriptions of the figures identical elements are provided with respective identical reference numerals.

FIG. 1 shows a simplified flow diagram for a steam reforming process 100 such as is known from the prior art, Natural gas 10 employed as the carbon-containing feedstock is sent to a unit for hydrodesulfurization 101 to completely remove sulfur compounds from the natural gas. The natural gas consists mainly of methane and, if necessary, is treated in a prereformer to react hydrocarbon compounds having two or more carbon atoms with steam to afford methane, carbon monoxide and hydrogen.

Figure 1:
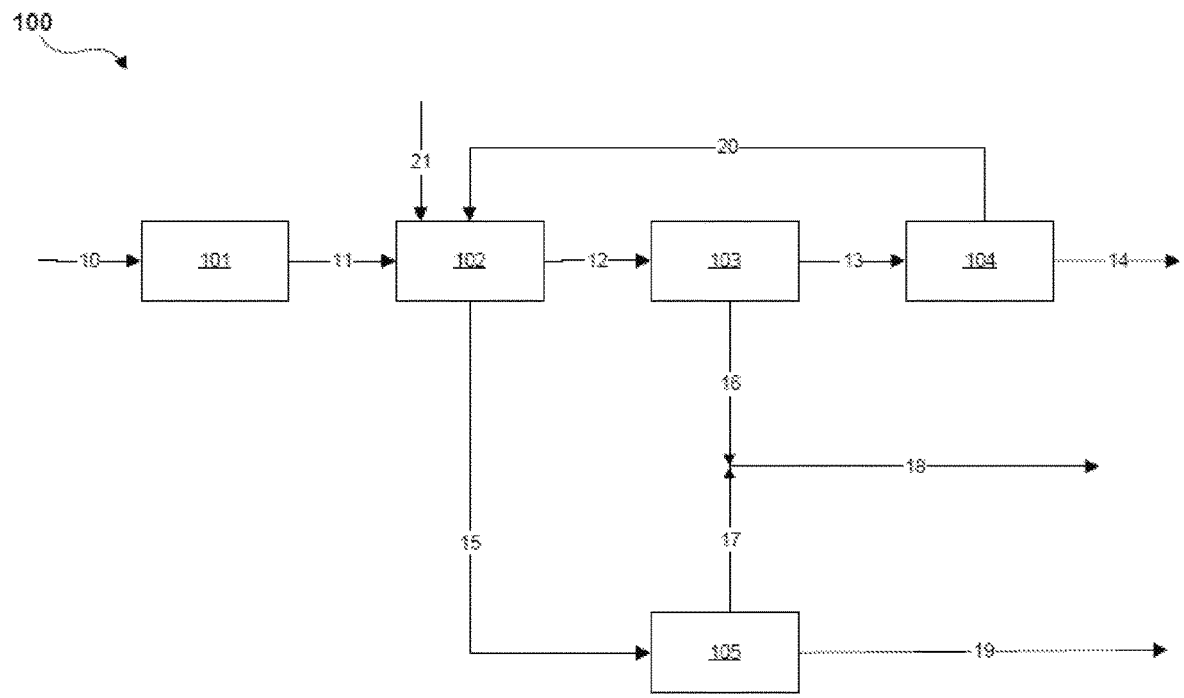
FIG. 1 shows a flow diagram for a steam reforming process 100 according to the prior art.

The desulfurized natural gas is heated (not shown) and sent to a unit for steam reforming 102. In the steam reforming unit 102 methane present in natural gas 11 and steam 21 sent to the steam reforming unit 102 are reacted at about 800° C. to 900° C. in a reformer furnace over a nickel catalyst to afford hot synthesis gas 12. The hot synthesis gas 12 comprises at least the constituents hydrogen, carbon monoxide and carbon dioxide. The hot synthesis gas 12 is subsequently sent to a synthesis gas cooling 103, for example a waste heat boiler. The process heat present in the hot synthesis gas 12 is in the waste heat boiler utilized for producing steam 16 which is withdrawn from the waste heat boiler of the synthesis gas cooling 103.

In order to increase the hydrogen yield synthesis gas produced in the context of the steam reforming 102 is optionally sent to a water gas shift unit (not shown) to react carbon monoxide present in the synthesis gas 12 with steam to afford carbon dioxide and hydrogen. This may be carried out before the synthesis gas cooling 103 in the context of a so-called high-temperature shift or after the synthesis gas cooling 103 in the context of a so-called low-temperature shift.

The steam reforming 102 is an endothermic process and is made possible by the direct firing of reaction tubes charged with nickel catalyst. The fuel gases utilized therefor combust to form hot combustion gases 15 which are cooled in a unit for combustion gas heat recovery 105. The process heat present in the hot combustion gases 15 is utilized for producing steam 17 which is withdrawn from the unit for combustion gas heat recovery 105. The cooled combustion gases 19 generated by steam production are simultaneously withdrawn from the unit for combustion gas heat recovery and discharged from the process.

The steam 16 obtained by the cooling of the hot synthesis gas 12 to give cold synthesis gas 13 and the steam 17 obtained by the cooling of the combustion gases 15 to give cooled combustion gases 19 are combined into a common stream of steam 18 and discharged from the process 100 as export steam.

Cold synthesis gas 13 is sent to a unit for pressure swing adsorption 104 in which hydrogen is separated from further gases present in the synthesis gas. The thus-generated off-gases 20 in part contain gases having a high calorific value, such as hydrogen, carbon monoxide and unconverted methane. These are returned to the steam reforming 102 and may therein be utilized as fuel gases.

The hydrogen 14 separated from the remaining synthesis gas constituents in the context of the pressure swing adsorption 104 is discharged from the process as primary product.

Figure 2:
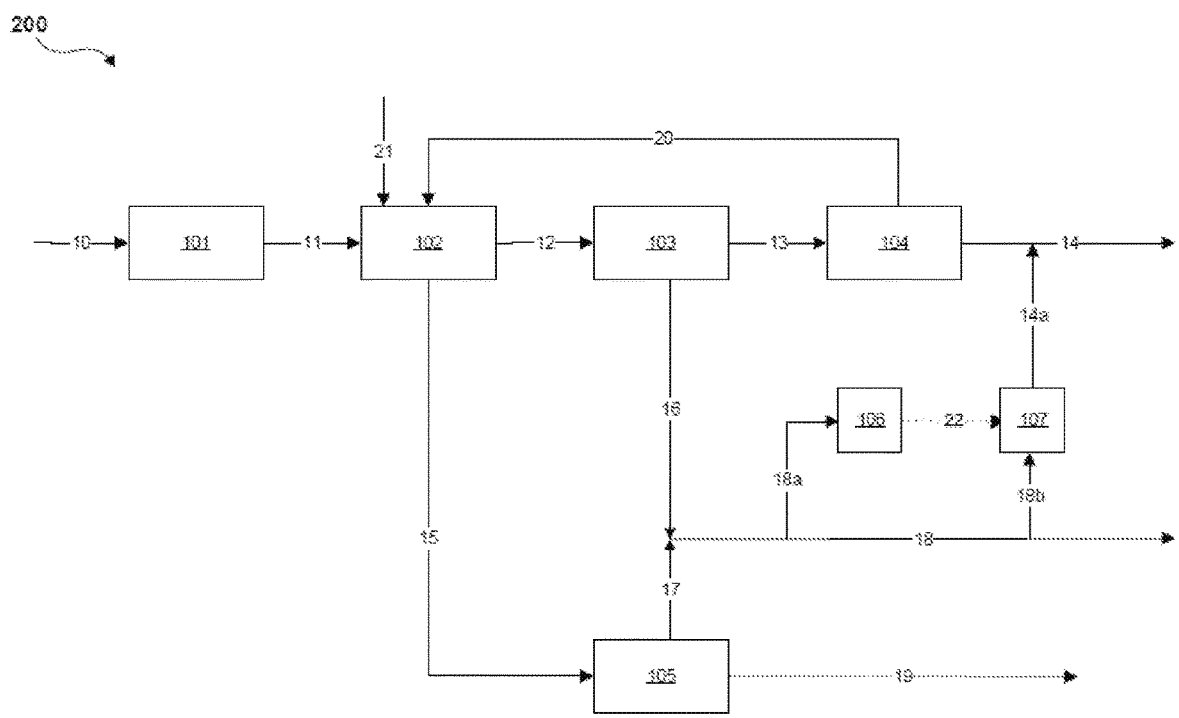
FIG. 2 shows a flow diagram for a process according to the invention 200 according to a first exemplary embodiment of the invention.

FIG. 2 shows a simplified flow diagram for a first example 200 of the process according to the invention which integrates both steam reforming and high-temperature electrolysis in a combined process.

Steam 18 obtained by transfer of process heat from the synthesis gas cooling 103 and the combustion gas heat recovery 105 is in the example of FIG. 2 partially diverted from the mainstream as steam 18a and utilized for generating electricity (electrical current). This is affected by a combination of a steam turbine and a generator 106. A portion of the produced steam 18 is simultaneously diverted from the main stream as steam 18b and utilized as reactant in a step of a high-temperature electrolysis 107 for producing hydrogen and oxygen. The electrolytic splitting of the steam 18b into hydrogen and oxygen utilizes the electricity generated by the combination of the steam turbine and the generator 106. In the context of the high-temperature electrolysis 107 hydrogen and oxygen are produced as separate streams. Oxygen is discharged from the process and otherwise employed (not shown). Hydrogen 14a is withdrawn from the high-temperature electrolyzer of the high-temperature electrolysis 107 and combined with hydrogen 14 which has been produced by the steam reforming 102 and has been purified.

Figure 3:
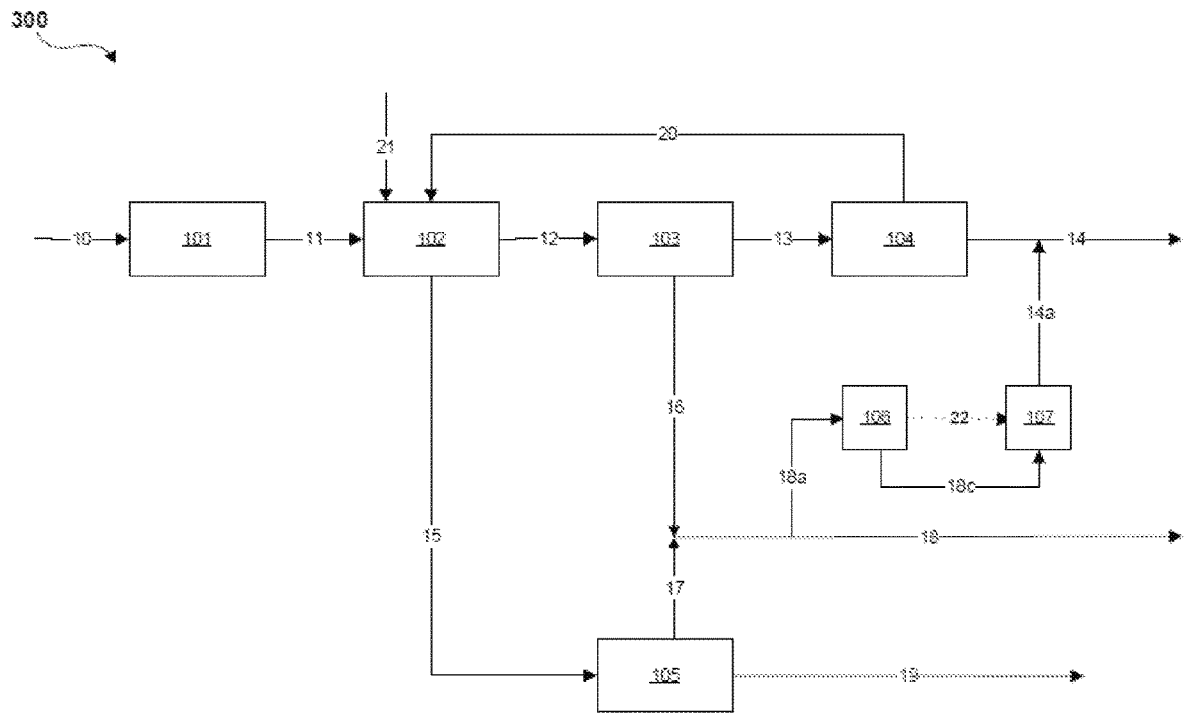
FIG. 3 shows a flow diagram for a process according to the invention 300 according to a second exemplary embodiment of the invention.

FIG. 3 shows a simplified flow diagram for a second example 300 of the process according to the invention which integrates both steam reforming and high-temperature electrolysis in a combined process.

The process of FIG. 3 differs from the process according to FIG. 2 in that a portion of the steam 18a sent to the combination of the steam turbine and the generator 106 is withdrawn from the steam turbine and sent to the step of the high-temperature electrolysis 107 as steam 18c. The steam 18c diverted from steam 18a is thus utilized not for electricity generation like steam 18a but rather as reactant steam in the high-temperature electrolysis 107 for producing a hydrogen- and oxygen-containing electrolysis product, FIG. 4 shows a simplified flow diagram for a third example 400 of the process according to the invention which integrates both steam reforming and high-temperature electrolysis in a combined process.

Figure 4:
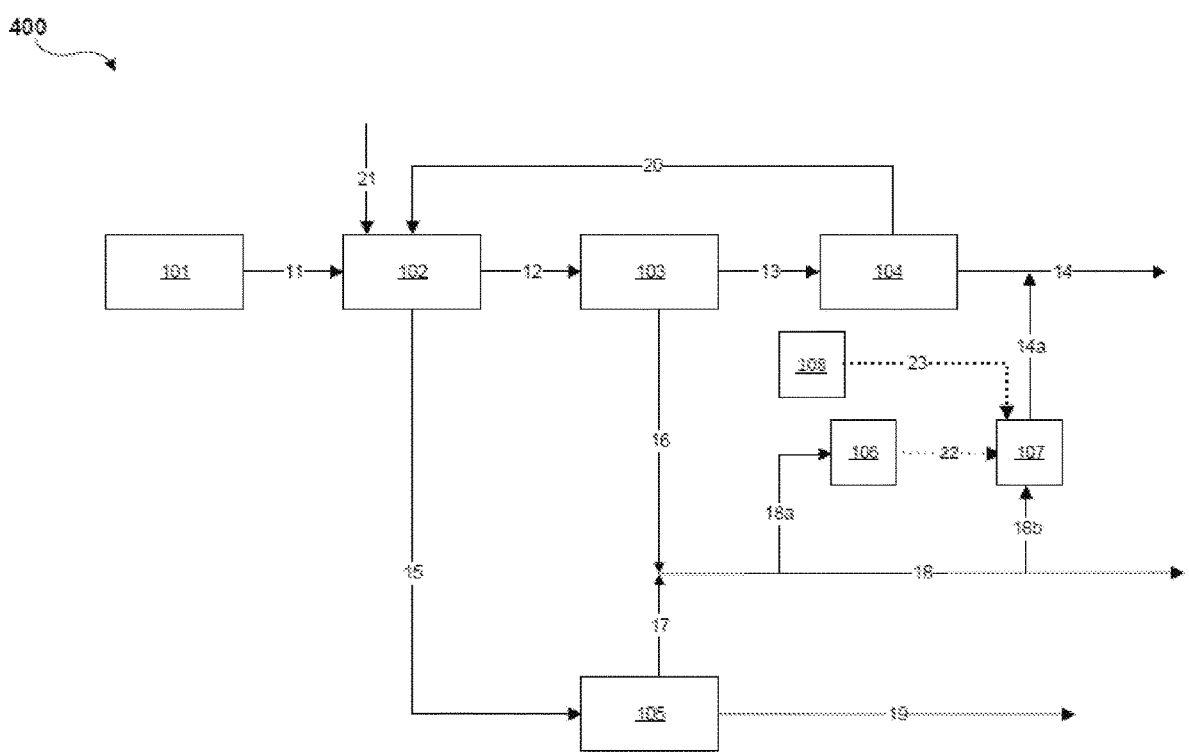
FIG. 4 shows a flow diagram for a process according to the invention 400 according to a third exemplary embodiment of the invention.

The process of FIG. 4 differs from the example of FIG. 2 in that only a portion of the electricity required for the high-temperature electrolysis 107 is generated indirectly by steam 18a using the combination of the steam turbine and the generator 106 (electrical current 22). A further portion of the electricity required for the high-temperature electrolysis 107 is provided by electricity from an external electricity source 108. An external electricity source 108 is an external electricity supply which preferably provides electricity from a renewable energy source, for example electricity from wind power or solar power.

Embodiments of the invention are described with reference to different types of subject-matter. In particular, certain embodiments are described with reference to process claims while other embodiments are described with reference to apparatus claims. However, it will be apparent to a person skilled in the art from the description hereinabove and hereinbelow that unless otherwise stated in addition to any combination of features belonging to one type of claim any combination of features relating to different types of subject-matter or types of claim may also be contemplated. Features may be combined to achieve synergistic effects which go beyond simple summation of the technical features.

While the invention has been represented and described in detail in the drawing and the preceding description, such a representation and description shall be considered elucidatory or exemplary and non-limiting. The invention is not limited to the disclosed embodiments, Other variations of the disclosed embodiments may be understood and executed by those skilled in the art of the field of the claimed invention from a study of the drawing, the disclosure and the dependent claims. Reference symbols in the claims are for exemplary elucidation and are nonlimiting to the invention.

LIST OF REFERENCE NUMERALS

10 Natural gas
11 Desulfurized and heated natural gas
12 Hot synthesis gas
13 Cold synthesis gas
14, 14a Hydrogen
15 Combustion gases
16 Steam (from synthesis gas cooling)
17 Steam (from combustion gas cooling)
18, 18a, 18b, 18c Steam
19 Cooled combustion gases
20 Offgas from pressure swing adsorption
21 Steam (for steam reforming)
22, 23 Electrical current
101 Hydrodesulfurization
102 Steam reforming
103 Synthesis gas cooling
104 Pressure swing adsorption
105 Combustion gas heat recovery
106 Steam turbine/generator
107 High-temperature electrolysis
108 External electricity source

What is claimed is:
1. A process for producing hydrogen by steam reforming and high-temperature electrolysis, comprising:
  (a) producing a synthesis gas from a carbon-containing starting material and steam by steam reforming, wherein the synthesis gas comprises at least hydrogen, carbon monoxide and carbon dioxide;
  (b) producing steam by heating water using process heat generated in step (a);
  (c) using the steam produced in step (b) as reactant in a high-temperature electrolysis step for producing an electrolysis product, wherein the electrolysis product comprises hydrogen and oxygen;

(d) separating hydrogen from the synthesis gas obtained in step (a) and from the electrolysis product obtained in step (c), wherein the high-temperature electrolysis step according to step (c) employs both steam and carbon dioxide as reactants, wherein the electrolysis product comprises synthesis gas and oxygen.

2. The process according to claim 1, wherein the process heat produced in step (a) is provided by cooling the synthesis gas produced in step (a).

3. The process according to claim 1 wherein the process heat produced in step (a) is provided by cooling combustion gases, wherein the combustion gases are produced during combustion of fuel gases, wherein the fuel gases are utilized for firing the endothermic reforming reaction in the steam reforming.

4. The process according to claim 1, wherein the steam produced in step (b) is utilized for generating electricity and the generated electricity is utilized for producing the electrolysis product in the high-temperature electrolysis step according to step (c).

5. The process according to claim 4, wherein the steam produced in step (b) is sent to a steam turbine and the electricity is generated by a generator arranged downstream of the steam turbine.

6. The process according to claim 5, wherein a portion of the steam is withdrawn from the steam turbine and sent as reactant to the high-temperature electrolysis step according to step (c).

7. The process according to claim 1, wherein an external electricity source is utilized for producing the electrolysis product in the high-temperature electrolysis step according to step (c).

8. The process according to claim 7, wherein the external electricity source provides electricity from a renewable energy source.

9. The process according to claim 1, wherein the high-temperature electrolysis step according to step (c) employs exclusively steam as reactant, wherein the electrolysis product comprises hydrogen and oxygen.

10. The process according to claim 1, wherein the synthesis gas comprises hydrogen and carbon monoxide.

11. The process according to claim 1, wherein the carbon dioxide used as reactant for the high-temperature electrolysis step is obtained by separation from the synthesis gas produced in step (a).

\* \* \* \* \*